United States Patent [19]

Pulver

[11] Patent Number: 4,467,551
[45] Date of Patent: Aug. 28, 1984

[54] FISHING LURE STORAGE APPARATUS

[76] Inventor: Peggy C. Pulver, P.O. Box 908, Forsyth, Mont. 59327

[21] Appl. No.: 453,769

[22] Filed: Dec. 27, 1982

Related U.S. Application Data

[63] Continuation-in-part of Ser. No. 287,289, Jul. 27, 1981, abandoned.

[51] Int. Cl.³ ............................................. A01K 97/00
[52] U.S. Cl. .................................. 43/54.1; 150/52 R; 206/315.1
[58] Field of Search ................ 43/54.1, 57.1, 41, 25.2, 43/26; 206/315.1, 461, 466; 150/39, 52 R, 52 B; 224/255, 199, 911, 920, 901; 229/62, 56, 53; 248/205 A

[56] References Cited

U.S. PATENT DOCUMENTS

| | | | |
|---|---|---|---|
| 891,055 | 6/1908 | Frost | 43/57.1 |
| 1,656,339 | 1/1928 | Runyan | 150/52 R |
| 1,688,699 | 10/1928 | Gardner | 150/7 |
| 1,736,343 | 11/1929 | Hawes | 43/57.1 |
| 1,980,104 | 11/1934 | Silverspitz | 150/52 R |
| 3,199,243 | 8/1965 | Caston | 43/25.2 |
| 3,289,826 | 12/1966 | Mosier | 248/205 A |
| 3,769,741 | 11/1973 | Hessler | 206/315 R |
| 3,829,995 | 8/1974 | Fakoury | 150/39 |
| 3,900,059 | 8/1975 | Kirk | 248/205 A |
| 3,949,916 | 4/1976 | Yount | 224/901 |
| 4,105,115 | 8/1978 | Horvath | 248/205 A |
| 4,119,249 | 10/1978 | Hanson | 229/56 |
| 4,251,712 | 2/1981 | Parr | 206/813 |

FOREIGN PATENT DOCUMENTS 1024111 3/1966 United Kingdom ................. 150/39

Primary Examiner—Gene P. Crosby
Attorney, Agent, or Firm—Arthur L. Urban

[57] ABSTRACT

Fishing lure storage apparatus is disclosed having an elongated base section, a plurality of separate cover sections disposed over one side of the base section, the cover sections being arranged adjacent to and overlapping each other along substantially the full length of the base section with the exception of an exposed portion at one end of the base section. Each cover section is secured to the base section along a transverse line dividing each cover section into a pocket portion and an overlapping restraining portion with the pocket portion being of substantially larger size than the restraining portion. A first releasable fastener is disposed on the exposed end portion of the base section for joining a cooperating second releasable fastener disposed on the opposite side from the first releasable fastener. A mounting mechanism is disposed on the same side as the second releasable fastener.

9 Claims, 3 Drawing Figures

FISHING LURE STORAGE APPARATUS

This application is a continuation-in-part of pending application, Ser. No. 287,289, filed July 27, 1981, now abandoned.

This invention relates to a novel storage apparatus and more particularly relates to a new apparatus for the storage of fishing lures.

Baits and lures of one type or another have been used by fishermen for many years. Originally, natural materials such as worms, minnows and the like were utilized as baits. While such baits even now are considered to be satisfactory by many fishermen, through the year fishermen have switched to the use of artificial lures for many different reasons.

With artificial lures, a fisherman does not have the problem of keeping his worms, minnows and the like alive until he needs them. A number of different devices and procedures have been developed to keep bait alive. Not only does the fisherman have to concern himself about keeping bait alive, but also even after he has purchased the necessary equipment to achieve this purpose he still has to lug the equipment with him and find places to store it during and after use.

Another reason that artificial lures have increased in popularity is the great variety of different lures that are possible. With natural baits, there is only a limited selection. However, with artificial lures, the possibilities are limitless and only depend on the fisherman's ability to develop and/or fabricate them. New lures are continually being offered to the public to satisfy their every desire or possible need.

While artificial lures may be considered the best means for catching fish, such lures are not without problems of their own. One major concern of a fisherman using lures is how to store them in a way which enables him to have them conveniently at hand when he is out fishing. If a fisherman has only a few lures, the lures can be carried easily in a tackle box. However, if a fisherman has a large number of lures, storage can become a problem. Either he has to purchase a number of tackle boxes or other storage boxes or he has to cram a large number of lures into a box which is not designed to accommodate them.

Even when a fisherman chooses to use an adequate number of boxes, he still has the problem of carrying all of the boxes and finding space in a boat for them. On the other hand, if he stuffs all of the lures into a single box, he probably will have difficulty removing one from the box when it is needed. Frequently, the lures become entangled with one another and much time can be spent in separating them. This activity not only takes valuable time that could be better spent fishing, but also the task can be very frustrating and spoil the pleasure of a fishing trip. The problem is particularly significant with large size lures such as those used for trolling which each take up considerable space.

The present invention provides a novel apparatus for the storage of fishing lures. The apparatus of the invention provides a convenient means for storing lures. The lures are easily accessible with the apparatus of the invention. Separate storage is provided for individual lures with the apparatus. The apparatus an store lures in a small amount of space. Selection of particular lures is easy with the apparatus.

The lure storage apparatus of the present invention is simple in design and the apparatus can be manufactured relatively inexpensively. The apparatus is durable in construction and has a long useful life.

The apparatus can be installed quickly on a supporting surface without special tools. The apparatus can be moved from one location to another simply and conveniently.

Other benefits and advantages of the novel fishing lure storage apparatus of the present invention will be apparent from the following description and the accompanying drawings in which.

Figure 1:
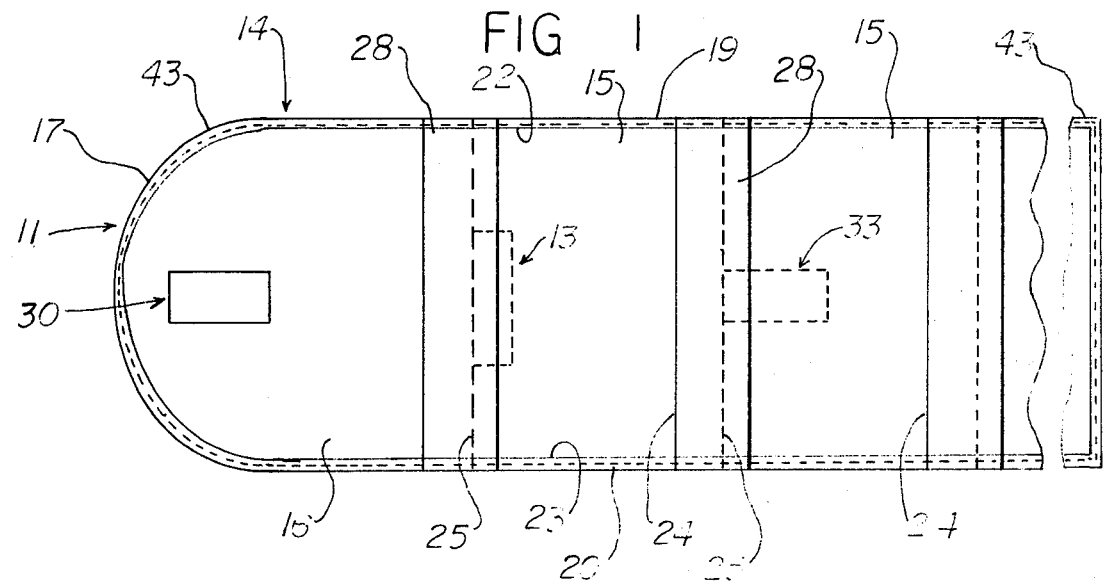
FIG. 1 is a broken top view of the fishing lure storage apparatus of the invention in an open position.
Figure 2:
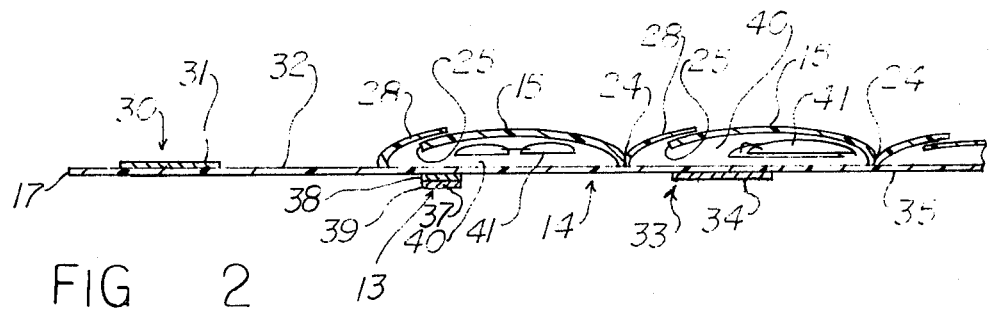
FIG. 2 is an enlarged edge view of a portion of the fishing lure storage apparatus shown in FIG. 1.

As shown in the drawings, one form of the fishing lure storage apparatus of the present invention is mounted for use on a supporting surface 12 such as an inside surface of a boat. The apparatus 11 may be mounted on the surface 12 with suitable mounting means 13 which will be described hereinafter.

The fishing lure storage apparatus 11 of the invention includes an elongated base section 14 with a plurality of separate cover sections 15 disposed over the base section. The cover sections 15 are arranged adjacent to and overlapping each other along substantially the full length of the base section 14 with the exception of an exposed portion 16 at one end 17 of the base section.

Each of the cover sections 15 extends from one longitudinal edge 19 of the base section 14 to the other longitudinal edge 20 thereof. The cover sections 15 each have a dimension along a longitudinal edge 19 or 20 which is a fraction of the length of the base section 14.

Means are utilized for affixing portions of the longitudinal edges 19 and 20 to adjoining edges 22 and 23 of the cover sections 15. Also, means are employed to affix a transverse line 24 of each of the cover sections to adjoining portions of the base section 14. Advantageously, the means for affixing the portions of the cover sections 15 to the base section may include adhesives, heat sealing, stitching and similar fastening techniques.

The transverse line 24 affixing the cover sections 15 to the base section 14 divide each cover section into a pocket portion 25 and an overlapping restraining portion 28. This construction provides a secure closure for each compartment. Also, it simplifies fabrication of the apparatus and reduces manufacturing costs.

The pocket portion 25 of the cover sections 15 is substantially larger in size than the restraining portion 28 as shown in the drawings. Advantageously, the pocket portion has a dimension along the longitudinal edges 19 and 20 of the base section 14 which is less than about the distance between the longitudinal edges.

The fishing lure storage apparatus 11 of the invention further includes first releasable fastening means 30. The first releasable fastening means 30 includes an engageable surface 31 disposed on the exposed end portion 16 at one end 17 of the base section 14. The engageable surface 31 of the fastening means 30 is disposed on the side 32 of the base section on which the cover sections 15 are affixed.

Second releasable fastening means 33 cooperates with the first releasable fastening means 30. The second fastening means 33 includes an engageable surface 34 disposed on the side 35 of the base section 14 opposite to the side 32 thereof on which the first releasable fastening means 30 is located. The second releasable fastening means 33 is spaced from the first fastening means 30 a distance approximately equal to twice the longitudinal dimension of one cover section 15.

Mounting means 13 is disposed on the side 35 of the base section 14 on which the second releasable fastening means 33 is located. The mounting means 13 is spaced approximately halfway between the first releasable fastening means 30 and the second releasable fastening means 33. The mounting means 13 like the first and second releasable fastening means 30 and 33 is located approximately halfway between the longitudinal edges of the base section 14.

The mounting means 13 may take a variety of different forms such as hooks, snaps, pins and the like. More advantageously, the mounting means 13 may include a combination of a hooked fabric portion 37 and a napped fabric portion 38, one of which is affixed to the base section 14 and the other of which has an exposed pressure sensitive adhesive surface 39. The pressure sensitive surface 39 is covered with a release coated paper (not shown) prior to attachment to a supporting surface.

The fishing lure storage apparatus 11 of the present invention may be fabricated from one or more of a wide variety of different materials and components. The apparatus 11 advantageously is fabricated of a flexible material such as cloth, plastic, leather or the like. Preferably, the base section 14 and the cover sections 15 are formed of transparent flexible material such as a plastic. Advantageously, the surfaces that have a tendency to wear may have a heavier edge, for example, the base section 14 may have a continuous peripheral reinforcement 43.

The fishing lure storage apparatus 11 of the invention may be fabricated by cutting the base section 14 and the cover sections 15 and securing them together in the desired configuration and arrangement as described above. Then, the first and second releasable fastening means 30 and 33 and the mounting means 13 are added in their proper positions. The apparatus is now ready for use.

Figure 3:
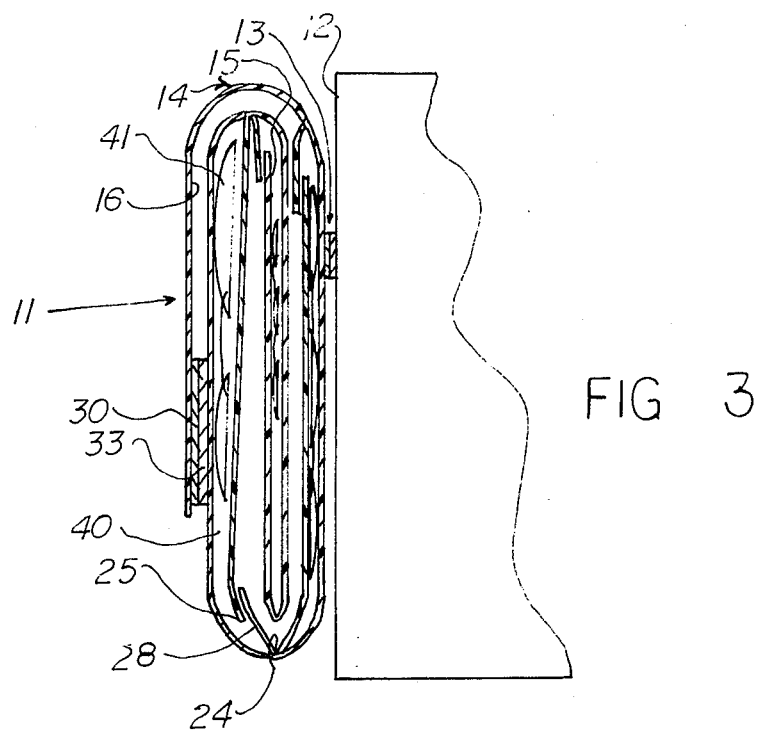
FIG. 3 is an edge view of the fishing lure storage apparatus of the invention in a closed position mounted on a supporting surface.

In the use of the lure storage apparatus 11, the apparatus is placed in an open position with the cover sections 15 exposed. Then, the compartments 40 of the apparatus are filled with lures 41 and other fishing paraphernalia. After the lures have been placed into the pockets, the apparatus 11 is folded into a closed configuration as shown in FIG. 3.

Next, a location for mounting the apparatus is selected. The location will depend upon the particular fishing habits of the user. For example, an individual may wish to have the apparatus 11 close to his tackle box. In this case, the release-coated paper is stripped from the pressure adhesive surface 39 of the mounting means 13 and the adhesive surface pressed against the side of the supporting surface 12.

When it is desired to use a lure or exchange it for one already in use, the apparatus 11 is removed from the tackle box by separating fabric portions 37 and 38 from each other. Then, the apparatus 11 is opened to expose the lures 41 stored in the compartments 40 of the apparatus 11. The desired lure is selected and removed from a compartment 40. The apparatus 11 is re-folded again for storage.

The mounting means 13 is secured to the tackle box or other surface 12 by reattaching the hooked fabric portion 37 to the napped fabric portion 38. In this way, the apparatus 11 with the lures 41 safely therein is stored until needed again while at the same time keeping the lures easily accessible. The apparatus 11 can be mounted on another supporting surface 12 attaching the mounting means 13 thereto.

The above description and the accompanying drawings show that the present invention provides a novel apparatus for the storage of fishing lures. The apparatus of the invention provides a convenient, easily accessible place for lure storage. The apparatus provides for separate storage for individual lures in a small space while providing easy and convenient selection of particular lures.

The lure storage apparatus of the present invention is simple in design and can be manufactured relatively inexpensively. The unique design provides a secure closure for each compartment as well as simplifying fabrication and reducing costs. The apparatus is durable in construction and has a long useful life.

The apparatus of the invention can be installed on a supporting surface quickly without special tools. The apparatus can be relocated in a different place simply and conveniently when desired.

It will be apparent that various modifications can be made in the particular lure storage apparatus described in detail above and shown in the drawings within the scope of the invention. The size, configuration and arrangement of compartments can be changed to meet specific requirements. Also, the materials employed in its fabrication can be different. In addition, the fastening means and the supporting means can be different as desired. These and other changes can be made in the apparatus of the invention provided the functioning and operation of the apparatus are not deleteriously affected. Therefore, the scope of the invention is to be limited only by the following claims.

What is claimed is:

1. Fishing lure storage apparatus including an elongated base section, a plurality of separate cover sections disposed over one side of said base section, said cover sections being arranged adjacent to and overlapping each other along substantially the full length of said base section with the exception of an exposed portion at one end of said base section, the overlapping edge of each of said cover sections being remote from said exposed portion of said base section, each of said cover sections extending from a longitudinal edge of said base section to the other, each of said cover sections having a dimension along a longitudinal edge of said base section which is a fraction of the length of said base section, means affixing portions of the longitudinal edges of said base section to adjoining edges of said cover sections, means affixing along an intermediate transverse line each of said cover sections to adjoining portions of said base section, said affixed transverse line dividing each cover section into a pocket portion and an overlapping restraining portion with the pocket portion being of substantially larger size than said restraining portion, first releasable fastening means including an engageable surface disposed on said exposed end portion of said base section, said engageable surface of said first releasable fastening means being disposed on the side of said base section on which said cover sections are affixed, cooperating second releasable fastening means including an engageable surface disposed on the side of said base section opposite to the side on which said first releasable fastening means is located, said first and second releasable fastening means being located intermediate the longitudinal edges of said base section, said releasable second fastening means being spaced from said first releasable fastening means a distance approximately equal to twice the longitudinal dimension of one cover section, mounting means disposed on the side of said base section on which said second releasable fastening means is located, said mounting means being spaced approximately halfway between said first and second releasable fastening means.

2. Fishing lure storage apparatus according to claim 1 wherein said first and second releasable fastening means include a combination of a hooked fabric portion and a napped fabric portion.

3. Fishing lure storage apparatus according to claim 1 wherein said first and second releasable fastening means are located approximately halfway between the longitudinal edges of said base section.

4. Fishing lure storage apparatus according to claim 1 wherein said pocket portions of said cover sections have a dimension along said longitudinal edges of said base section less than about the distance between said longitudinal edges.

5. Fishing lure storage apparatus according to claim 1 wherein said affixing means between said cover sections and said base section includes heat sealing means.

6. Fishing lure storage apparatus according to claim 1 wherein said affixing means between said cover sections and said base section includes stitching.

7. Fishing lure storage apparatus according to claim 1 wherein said mounting means includes a combination of a hooked fabric portion and a napped fabric portion.

8. Fishing lure storage apparatus according to claim 1 wherein said base section and said cover sections are fabricated of a transparent flexible material.

9. Fishing lure storage apparatus according to claim 1 wherein said base section includes a continuous peripheral reinforcement.

* * * * *